Dec. 25, 1962     F. S. ALLINQUANT     3,070,191
SINGLE-TUBE TELESCOPIC HYDRAULIC DAMPING DEVICE
Filed Oct. 27, 1959     2 Sheets-Sheet 1
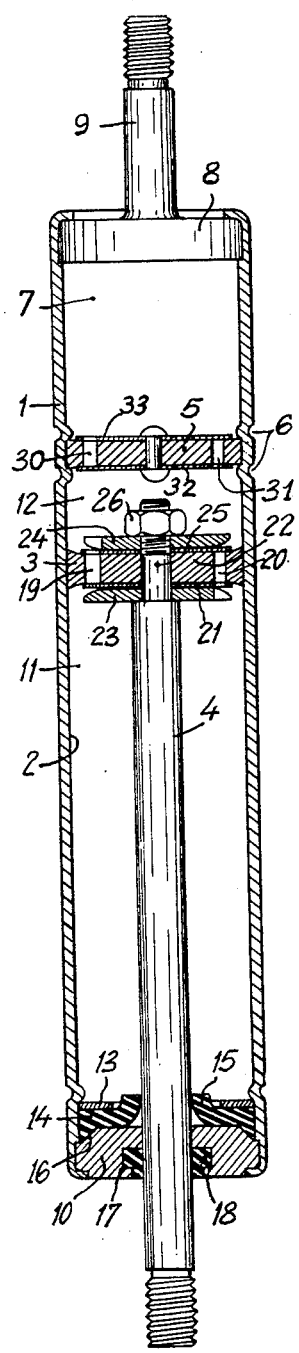
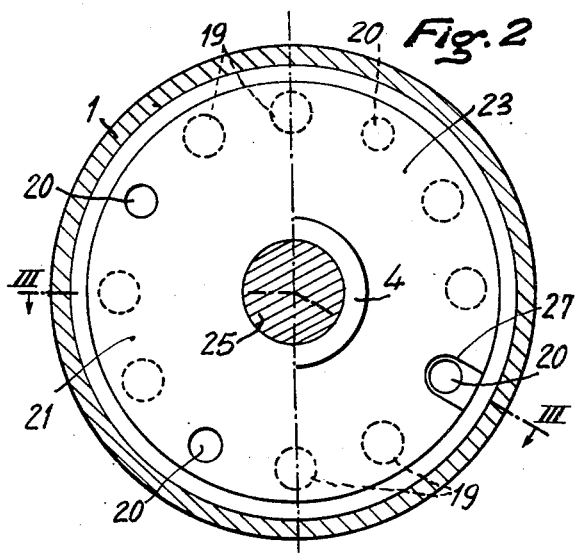

Dec. 25, 1962   F. S. ALLINQUANT   3,070,191
SINGLE-TUBE TELESCOPIC HYDRAULIC DAMPING DEVICE
Filed Oct. 27, 1959   2 Sheets-Sheet 2
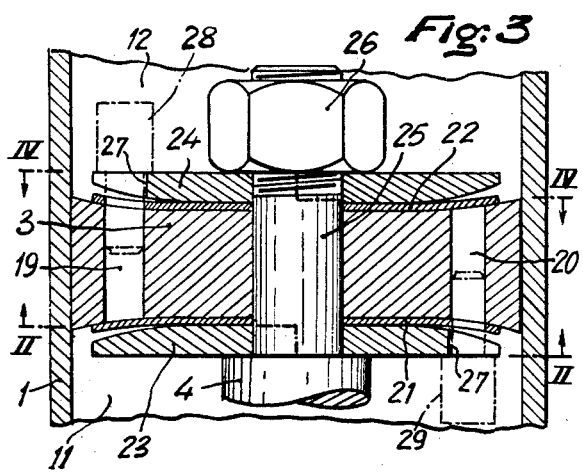
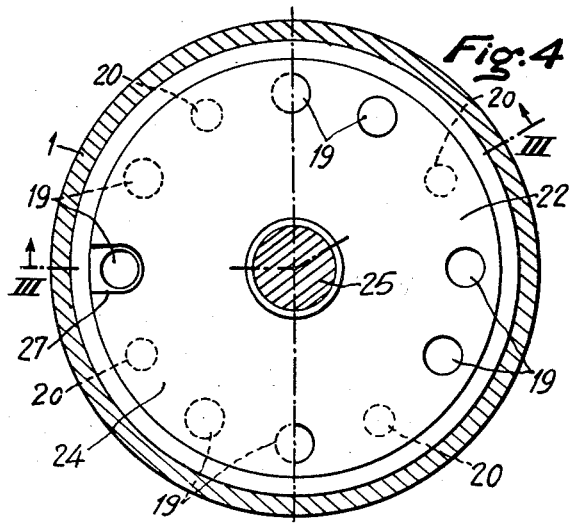

United States Patent Office 3,070,191
Patented Dec. 25, 1962

3,070,191
SINGLE-TUBE TELESCOPIC HYDRAULIC
DAMPING DEVICE
Fernand Stanislas Allinquant, 6–10 Rue Olier,
Paris 15, France
Filed Oct. 27, 1959, Ser. No. 849,098
Claims priority, application France Nov. 13, 1958
1 Claim. (Cl. 188—88)

This invention relates to a single-tube telescopic hydraulic damping device.

This type of damping device, as is well known, consists of a tube closed at one end by an end wall, and fitted with a piston which slides in a portion of this tube forming a cylinder extending from the open end of the tube, said piston having a connecting rod which traverses a fluid-tight sealing device fitted in this open end. The cylinder is completely filled with oil and is bounded, at some distance from the solid end wall of the tube, by a partition which is pierced with passages fitted with obturators for the flow of the oil in opposite directions, and which separates this cylinder from a compensation chamber. This compensation chamber contains a reserve of oil and a quantity of air under pressure, and supplies or absorbs volumes of oil equal to the variations in volume of the immersed portion of the piston rod. The piston, which divides the cylinder into two spaces, has passages opposing the flow of oil from one of the spaces to the other with a resistance which effects the damping of the telescopic movements of the damping device corresponding to the sliding of the piston in the cylinder.

The efficiency of such a damping device and its length of service depend both on the proper working of the valves of the oil passages through the partition separating the cylinder from the compensation chamber and through the piston itself, and on the efficiency of the sealing joint which is supposed to prevent any escape of oil along the piston rod where it leaves the cylinder. Many solutions have been put forward for the arrangement of these elements; some arrangements, though carefully planned, did not give in actual practice the results which were hoped for, while others, though giving more satisfactory results, are still very expensive. Noticeable progress has been effected by using foil type valves and a lip joint for the sealing device.

This invention relates to a single-tube telescopic hydraulic damping device using foil type valves and a lipped joint type sealing device, particularly simple in construction and hence cheap to produce, while still ensuring very satisfactory operation and long life for a damping device of this type, as has been proved by a large number of tests.

According to the invention, the oil passages through the piston consist of perforations arranged in a crown round the axis, covered on each of the opposite faces of the piston by a circular foil valve or flap, one valve having holes corresponding to some of these perforations and solid portions covering the mouths of the others, while the other valve has holes corresponding with the perforations covered by the first valve and solid portions covering the perforations left open by the first valve. The oil passages through the partition separating the cylinder from the compesation chamber are also perforated and provided with foil type valves, arranged in a similar way. The fluid-tight device consists of a joint with an inner lip, which is locked against a support ring held in the cylinder by the chamfered surface of a guide ring for the piston rod, accommodating a scraper.

The preceding constructional features will be better understood from the following description of a damping device in accordance with the invention, given by way of example with reference to the accompanying drawings, in which:

FIGURE 1 is an axial section of the damping device in the planes indicated by the lines III—III in FIGURES 2 and 4, which represent transverse sections of the damping device on a larger scale, FIGURE 2 shows one surface of the piston in its cylinder, shown by halves in two offset cutting planes indicated by the broken line II—II in FIGURE 3, FIGURE 3 shows on the same scale the piston by itself, seen sectioned as in FIGURE 1, and FIGURE 4 shows the piston surface opposite to that in FIGURE 2 and seen by halves in two offset cutting planes, indicated by the broken line IV—IV in FIGURE 3.

The damping device consists, as with the known type, of a tube 1 which is bored so as to form over the greater part of its length a cylinder 2, and a piston 3 with a piston rod 4, sliding in this cylinder. The cylinder 2 terminates in a partition 5, pierced with oil passages which is fixed between indentations 6 in the wall of the tube and which separates the cylinder 2 from a compensation chamber 7. At the two ends of the tube 1, bores of larger diameter each form a seating and a stop shoulder for a tube closure member retained by crimping. The compensation chamber is bounded by a solid end piece 8 provided with a connecting rod 9 for fixing the tube to the frame of a vehicle and the cylinder 2 is bounded by a ring 10 guiding the piston rod 4 (which is intended to be attached to an axle of the vehicle) at the outlet of the cylinder 2. The piston 3 separates two spaces 11, 12 completely filled with oil, in the cylinder 2, which spaces can be placed into communication with one another by means of passages through the piston, and the compensation chamber 7 contains a reserve of oil under an atmosphere of compressed air which ensures compensation for the variations in volume of the immersed piston rod.

According to the invention the sealing device, using an ordinary commercial type lipped joint, is constructed as follows. At a certain distance inside the support shoulder of the guide ring 10, a flat metal washer 13 is held by crimpings of the wall of the tube so as to lend support to the joint. The rubber washer 14 of the joint with its central aperture reduced by the strain forms a lip 15 turned inwards which is tightly applied, due to its elasticity and under the action of the oil pressure in the space 11 of the cylinder, against the rod 4, ensuring fluid-tightness along this rod. The washer 14 is locked on its periphery against the support washer 13 by the peripheral portion of the ring 10. This latter has a chamfer 16 providing an annular space of wedge-like section into which the incompressible rubber of the washer 14 flows, applying itself against the wall of the tube so as to ensure fluid tightness along this wall. A rod scraper is provided to protect the joint against dust. With this in view the ring 10 which is pierced in its part directed inwards to the diameter of the rod 4 for the purpose of guiding the said rod, has a larger diameter in its part directed towards the exterior, these two diameters of the bore being separated by a throat 17 which receives the outer beading of a rubber ring 18 sliding on the rod and thus acting as a scraper.

According to another structural feature, the oil flow passages through the piston 3 are formed by an even number of perforations, the actual number not being important, arranged in a ring round the axis of the piston. A certain number of these perforations are allotted to each direction of flow; the number and diameter of the said perforations may vary according to the direction in question. In the embodiment represented eight perforations of larger diameter 19 are provided (see FIGURES 3 and 4) for the flow from the space 12 to the space 11 of the cylinder during compression and four perforations of smaller diameter 20 (see FIGURES 2 and 3) for the flow in the opposite direction during extension. The perforations are distributed uniformly and two perforations of larger diameter alternate with one perforation of smaller diameter.

On the two surfaces of the piston 3 the ring of perforations is covered by a disc of foil material 21 or 22 forming a valve or flap (FIGURE 3), each held under a backing washer 23 or 24 the inner surface of which is of convex toric form round its periphery, and the five components 23, 21, 3, 22 and 23, bored to the same diameter, are stacked on one end 25 of reduced diameter of the piston rod 4, supported against the shoulder formed by the reduction in size of this shank of the rod, and are locked by a nut 26 screwed on the threaded end of the rod.

The foil 21 (FIGURES 2 and 3) acts as a valve for the perforations 19 and covers their outlet into the space 11 by solid parts (see the left hand half of FIGURE 2) while it is pierced with holes corresponding to the perforations 20. The foil 22 of the opposite surface acts as a valve for these latter perforations 20 and covers their outlet into the space 12 by solid portions (see the right hand half of FIGURE 4), while it is pierced with holes corresponding to the first perforations 19. In order to ensure the correct orientation of the two foils in relation to the piston in the stack of components threaded on the end of the rod 25, each backing washer 24 and 23 has a notch 27 sufficiently large to uncover a perforation in its valve 22 or 21 so that each valve can be oriented by means of a pin 28 or 29, which engages on the upper surface of the piston in a perforation 19 through a corresponding hole in the valve 22 and on the under surface in a perforation 20 through a corresponding hole in the valve 21.

As regards the mode of working, the lift of the valves is restricted by the backing washers; the alternate arrangement of the perforations associated with opposed directions of flow means that this lift consists of a mere flexion of the portions of the valve covering the perforations. The foils are applied on the perforations with a certain resilient force, which may be produced by their being resiliently strained in the closure position, or in the free state they may have a certain amount of concavity and be flattened by being held against a flat surface, or on the other hand they may be flat and applied against a slightly concave surface. Although the resistances opposed to the two directions of flow should be different, the same foils may be used for the two surfaces if the perforations are made to differ as regards their number and diameter for the two directions of flow, as has been described. It is also possible to have valves differing as regards their resilience due to a difference in thickness of the foils used, or produced by adding several foils together.

The flow passages through the partition 5 are formed in a similar manner to that which has just been described by perforations 30 and 31 arranged alternately in a ring and covered on the opposite surfaces of the partition by foil valves 32 and 33 which each cover a number of these perforations and are pierced with holes which uncover the other. Of course, the resistance to the flow of oil from the cylinder (space 12) towards the compensation chamber 7 should be greater than the resistance of the flow in the opposite direction, and this should be weak so that there is no risk of cavitation being produced above the piston.

I claim:

In a single-tube telescopic hydraulic damping device, comprising a cylinder longitudinally divided into three parts by an upper partition and by a piston movable in said cylinder below said partition, said upper partition being clamped in said cylinder and defining an upper compensation chamber, and said piston movable in said cylinder below said partition defining two working chambers, both said partition and said piston being pierced on a circumference of the same diameter near the periphery of each with a plurality of equally spaced perforations, both said piston and said partition being provided with the same number of perforations dimensioned and disposed in identical manner, and a pair of disc sheet valves bearing on the opposite faces of said partition and a pair of disc sheet valves being on the opposite faces of said piston, the two pairs of disc sheet valves being of an equal diameter sufficient to cover said perforations, one of the discs in each pair of disc sheet valves being perforated in the same manner in register with some of the perforations symmetrically disposed around the center of the disc and the other disc of the pair being perforated in the same manner in register with the other perforations.

References Cited in the file of this patent

UNITED STATES PATENTS

| | | |
|---|---|---|
| 2,239,112 | Nichelsen | Apr. 22, 1941 |
| 2,314,404 | Katcher | Mar. 23, 1943 |
| 2,467,098 | Rossman | Apr. 12, 1949 |
| 2,676,676 | Strauss | Apr. 27, 1954 |
| 2,748,898 | Carbon | June 5, 1956 |
| 2,792,914 | Benard | May 21, 1957 |
| 2,811,226 | Allinquant | Oct. 29, 1957 |
| 2,987,146 | Allinquant | June 1, 1961 |

FOREIGN PATENTS

| | | |
|---|---|---|
| 214,919 | Australia | May 20, 1956 |
| 726,898 | Great Britain | Mar. 23, 1956 |
| 474,507 | Italy | Sept. 25, 1952 |